(12) United States Patent
Bayardo, Jr. et al.

(10) Patent No.: US 7,584,453 B2
(45) Date of Patent: *Sep. 1, 2009

(54) METHOD FOR SHARING SOURCE CODE OVER A NETWORK

(75) Inventors: Roberto J. Bayardo, Jr., San Jose, CA (US); Yurdaer N. Doganata, Chestnut Ridge, NY (US); Youssef Drissi, Ossining, NY (US); Tong-Haing Fin, Harrison, NY (US); Moon J. Kim, Wappingers Falls, NY (US); Lev Kozakov, Stamford, CT (US); Juan L. Rodriguez, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/847,365

(22) Filed: Aug. 30, 2007

(65) Prior Publication Data

US 2007/0294264 A1 Dec. 20, 2007

Related U.S. Application Data

(63) Continuation of application No. 10/608,204, filed on Jun. 27, 2003.

(51) Int. Cl.
*G06F 9/44* (2006.01)
*G06F 15/16* (2006.01)

(52) U.S. Cl. ................. 717/120; 717/122; 709/219

(58) Field of Classification Search ............. 717/131, 717/140, 144, 120–123; 709/201, 217–219; 707/100, 203

See application file for complete search history.

(56) References Cited

U.S. PATENT DOCUMENTS

| 4,558,413 | A | * | 12/1985 | Schmidt et al. | ............. 707/203 |
| 4,931,928 | A | * | 6/1990 | Greenfeld | ................... 717/131 |
| 5,555,201 | A | | 9/1996 | Dangelo et al. | |
| 5,625,823 | A | | 4/1997 | Debenedictis et al. | |
| 5,862,382 | A | * | 1/1999 | Kataoka | ................... 717/131 |
| 5,940,834 | A | | 8/1999 | Pinard et al. | |
| 5,999,729 | A | | 12/1999 | Tabloski, Jr. et al. | |

(Continued)

FOREIGN PATENT DOCUMENTS

WO     WO 0180101 A1     10/2001

OTHER PUBLICATIONS

U.S. Appl. No. 10/608,204, RCE Amendment, Jan. 20, 2009, 21 pages.

(Continued)

*Primary Examiner*—Lewis A Bullock, Jr.
*Assistant Examiner*—Jason Mitchell
(74) *Attorney, Agent, or Firm*—Anna Linne; Hoffman Warnick LLC

(57) ABSTRACT

Under the present invention source code can be shared among nodes in a peer-to-peer network. Specifically, source code to be shared will first be analyzed to identify a set of code patterns, assigned one or more predetermined categories based on the set of code patterns, and then selectively indexed. A developer desiring to use previously created source code when creating a new program can perform a context dependent search based on his/her working code to identify and retrieve relevant source code.

5 Claims, 3 Drawing Sheets

U.S. PATENT DOCUMENTS

| | | | |
|---|---|---|---|
| 6,020,884 | A | 2/2000 | MacNaughton et al. |
| 6,081,812 | A | 6/2000 | Boggs et al. |
| 6,085,242 | A | 7/2000 | Chandra |
| 6,098,091 | A | 8/2000 | Kisor |
| 6,119,153 | A | 9/2000 | Dujari et al. |
| 6,138,159 | A | 10/2000 | Phaal |
| 6,185,587 | B1 | 2/2001 | Bernardo et al. |
| 6,785,704 | B1 | 8/2004 | McCanne |
| 2002/0048269 | A1 | 4/2002 | Hong et al. |
| 2002/0116444 | A1 | 8/2002 | Chaudhri et al. |
| 2003/0088571 | A1* | 5/2003 | Ekkel ................. 707/100 |
| 2004/0044648 | A1 | 3/2004 | Anfindsen et al. |
| 2004/0064512 | A1 | 4/2004 | Arora et al. |
| 2004/0098447 | A1* | 5/2004 | Verbeke et al. ............ 709/201 |
| 2004/0143666 | A1 | 7/2004 | Xu et al. |
| 2004/0148326 | A1 | 7/2004 | Nadgir et al. |
| 2004/0194072 | A1* | 9/2004 | Venter ................. 717/140 |
| 2004/0215625 | A1 | 10/2004 | Svendsen et al. |
| 2005/0138110 | A1 | 6/2005 | Redlich et al. |
| 2005/0262488 | A1* | 11/2005 | Wagner et al. ............ 717/144 |

OTHER PUBLICATIONS

U.S. Appl. No. 10/608,204, Advisory Action, Jan. 6, 2009, 4 pages.
U.S. Appl. No. 10/608,204, Amendment to Final Office Action, Dec. 11, 2008, 18 pages.
U.S. Appl. No. 10/608,204, Final Office Action, Oct. 30, 2008, 24 pages.
U.S. Appl. No. 10/608,204, Amendment to Office Action, Jun. 20, 2008, 16 pages.
U.S. Appl. No. 10/608,204, Office Action, Mar. 28, 2008, 29 pages.
U.S. Appl. No. 10/608,204, Amendment to Final Office Action, Jan. 18, 2008, 15 pages.
U.S. Appl. No. 10/608,204, Final Office Action, Nov. 20, 2007, 12 pages.
U.S. Appl. No. 10/608,204, Supplemental Amendment, Aug. 30, 2007, 14 pages.
U.S. Appl. No. 10/608,204, Amendment to Office Action, Jul. 9, 2007, 20 pages.
U.S. Appl. No. 10/608,204, Office Action, Apr. 9, 2007, 15 pages.
U.S. Appl. No. 10/608,204, Amendment To Office Action, Jan. 4, 2007, 19 pages.
U.S. Appl. No. 10/608,204, Office Action, Oct. 10, 2006, 11 pages.

* cited by examiner

METHOD FOR SHARING SOURCE CODE OVER A NETWORK

CLAIM OF PRIORITY

This continuation application claims priority to co-pending patent application identified by Ser. No. 10/608,204, filed on Jun. 27, 2003, entitled "Method, System and Program Product for Sharing Source Code Over a Network", the contents of which is hereby incorporated by reference.

CROSS-REFERENCE TO CO-PENDING APPLICATIONS

This application is related in some aspects to commonly owned U.S. patent application Ser. No. 10/295,717, filed Nov. 15, 2002, entitled "Method for Directly Providing Content and Services Via a Computer Network," and to commonly owned U.S. provisional patent application Ser. No. 60/332,651, filed Nov. 16, 2001, entitled "Method for Directly Providing Content and Services Via a Computer Network," both of which are hereby incorporated by reference.

FIELD OF THE INVENTION

The present invention generally relates to a method for sharing source code over a network. Specifically, the present invention allows source code to be shared, indexed and retrieved over a computer network such as a peer-to-peer network.

BACKGROUND OF THE INVENTION

As computer technology becomes more advanced, file sharing over computer networks has become an important tool for both business and education. For example, today computer users have the capability to share data, audio and video files (i.e., in a legal fashion) with one another using their own computerized devices. On particular type of network that has gained increasing popularity for file/data sharing is a peer-to-peer network (commonly referred to as a P2P network). In general, a peer-to-peer networking model can be implemented in conjunction with private networks such as a local area network (LAN), a wide area network (WAN), a virtual private network (VPN), or with a public network such as the Internet. In a peer-to-peer networking model, several computerized "nodes" are interconnected. Each node typically has the same capabilities, and can initiate a communication session with another node. A peer-to-peer networking model can be contrasted against the client/server or master/slave model in which the server/master has distinct capabilities that the clients/slaves might not have. However, in some cases, peer-to-peer communications are implemented by providing each node both server and client capabilities. One example of a product that supports a peer-to-peer networking model is Advanced Peer-to-Peer Networking (APPN), which is commercially available from International Business Machines, Corp. of Armonk, N.Y. In more recent usage, peer-to-peer networking has come to describe applications in which users can use the Internet to exchange files with each other directly or through a mediating server.

One particular area in which peer-to-peer file sharing has not been extended is for sharing source code. Specifically, when a software developer is attempting to write new source code for a particular product, it can be extremely helpful to him/her to have access to the code of previously developed products that are related to his/her product. Today, many software developers use an Integrated Development Environment (IDE) as a programming tool kit that integrates different editors, wizards, compilers, debuggers, and other necessary tools. Although such programming tool kits usually provide sophisticated help systems, as well as other resources that can assist in designing and implementing code, modern IDEs do not support one of the most popular methods of writing code, namely, programming by example. Although some tools exist for creating new code with design patterns and search code patterns in an object-oriented database, such tools are based on internal code databases. To this extent, the existing tools fall far short of providing shared access to useful source code patterns that were created by individual programmers, and that are stored at multiple locations over a network.

In view of the foregoing, there exists a need for a method, system and program product for sharing source code over a network. Specifically, a need exists for a system that allows source code to be shared, indexed and retrieved in a peer-to-peer networking environment. Still yet, a need exists for providing access to source code patterns created by multiple developers and stored at multiple locations over a peer-to-peer network. A further need exists for providing efficient classification-based navigation and content dependent searching for code patterns from within a local IDE.

SUMMARY OF THE INVENTION

In general, the present invention provides a method, system and program product for sharing source code over a network. Specifically, under the present invention, each node in a peer-to-peer network is provided with an Integrated Development Environment (IDE), a code sharing system, and a code access/retrieval system. When a developer using a node wishes to share code, the code sharing system on that node will be initiated. First, the source code to be shared will be analyzed in an attempt to identify a set of code patterns. Based on the identified code patterns, one or more predetermined categories will be assigned to the source code. Thereafter, code pattern information based on the code patterns and assigned categories will be stored in a centrally available code pattern directory. The source code will then be selectively indexed, and a notification about the availability of the source code will be communicated to the other nodes in the network. If a developer using another node is developing new source code (i.e., "working code"), and he/she wishes to use some previously completed, relevant source code as a reference, the code access system on the latter developer's node will be initiated. Once initiated, the code access system will first analyze the working code to identify a context thereof. Based on the context, one or more of the predetermined categories will be assigned to the working code. Then, using those categories, the directory is queried and a list of categories assigned to previously developed source code that is relevant to the working code is returned. When the developer selects a particular category from the list, the corresponding source code is retrieved from the appropriate node. Thus, the present invention provides access to source code patterns that were created by multiple developers, and that are stored at multiple locations over a peer-to-peer network. Moreover, the present invention provides efficient classification-based navigation and content dependent searching for code patterns from within a local IDE.

A first aspect of the present invention provides a method for sharing source code over a network, comprising: analyzing source code generated on a sharing node in the network to identify a set of code patterns, and assigning at least one predetermined category to the source code based on the identified set of code patterns; storing code pattern information that is based on the analysis and assignment in a directory; and selectively indexing the source code.

A second aspect of the present invention provides a system for sharing source code over a network, comprising: a code pattern classifier for analyzing source code generated on a sharing node in the network to identify a set of code patterns, and for assigning at least one predetermined category to the source code based on the identified set of code patterns, wherein code pattern information that is based on the analysis and assignment is stored in a directory; and a source code indexer for selectively indexing the source code.

A third aspect of the present invention provides a program product stored on a recordable medium for sharing source code over a network, which when executed, comprises: program code for analyzing source code generated on a sharing node in the network to identify a set of code patterns, and for assigning at least one predetermined category to the source code that is based on the identified set of code patterns, wherein code pattern information based on the analysis and assignment is stored in a directory; and program code for selectively indexing the source code.

A fourth aspect of the present invention provides a method for selectively indexing source code for sharing over a network, comprising: recognizing at least one programming language of the source code; indexing relevant portions of the source code based on the at least one programming language; recognizing and indexing a graph of source code dependencies corresponding to the source code; and recognizing and indexing a set of code types in a hierarchy associated with the source code.

A fifth aspect of the present invention provides a system for selectively indexing source code for sharing over a network, comprising: a programming language recognizer for recognizing at least one programming language of the source code; a selective code content indexer for indexing relevant portions of the source code based on the at least one programming language; a dependency graph indexer for recognizing and indexing a graph of source code dependencies corresponding to the source code; a code type hierarchy recognizer for recognizing a code type hierarchy associated with the source code; and an associated code type indexer for indexing a set of code types from the code type hierarchy that is associated with the source code.

A sixth aspect of the present invention provides a program product stored on a recordable medium for selectively indexing source code for sharing over a network, which when executed, comprises: program code for recognizing at least one programming language of the source code; program code for indexing relevant portions of the source code based on the at least one programming language; program code for recognizing and indexing a graph of source code dependencies corresponding to the source code; program code for recognizing a code type hierarchy associated with the source code; and program code for indexing a set of code types from the code type hierarchy that is associated with the source code.

A seventh aspect of the present invention provides a method for accessing source code shared over a network, comprising: analyzing working code on a receiving node in the network to identify a context of the working code, and assigning at least one predetermined category to the working code based on the identified context; querying a directory using the at least one predetermined category assigned to the working code to identify at least one predetermined category assigned to source code that is relevant to the working code; and retrieving the source code from a sharing node in the network to the retrieving node based on the at least one category assigned to the source code.

An eighth aspect of the present invention provides a system for accessing source code shared over a network, comprising: a context classifier for analyzing working code on the receiving node to identify a context of the working code, and for assigning at least one predetermined category to the working code based on the identified context; a query generator for querying a directory using the at least one predetermined category assigned to the working code to identify at least one predetermined category assigned to source code that is relevant to the working code; and a code pattern requestor for retrieving the source code from a sharing node in the network to the receiving node based on the at least one predetermined category assigned to the source code.

A ninth aspect of the present invention provides a program product stored on a recordable medium for accessing source code shared over a network, which when executed comprising: program code for analyzing working code on the receiving node to identify a context of the working code, and for assigning at least one predetermined category to the working code based on the identified context; program code for querying a directory using the at least one predetermined category assigned to the working code to identify at least one predetermined category assigned to source code that is relevant to the working code; and program code for retrieving the source code from a sharing node in the network to the receiving node based on the at least one predetermined category assigned to the source code.

Therefore, the present invention provides a method, system and program product for sharing source code over a network.

BRIEF DESCRIPTION OF THE DRAWINGS

These and other features of this invention will be more readily understood from the following detailed description of the various aspects of the invention taken in conjunction with the accompanying drawings in which.

Is noted that the drawings of the invention are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

As indicated above, the present invention provides a method, system and program product for sharing source code over a network. Specifically, under the present invention, each node in a peer-to-peer network is provided with an Integrated Development Environment (IDE), a code sharing system, and a code access/retrieval system. When a developer using a node wishes to share code, the code sharing system on that node will be initiated. First, the source code to be shared will be analyzed in an attempt to identify a set of code patterns. Based on the identified code patterns, one or more predetermined categories will be assigned to the source code. Thereafter, code pattern information based on the code patterns and assigned categories will be stored in a centrally available code pattern directory. The source code will then be selectively indexed, and a notification about the availability of the source code will be communicated to the other nodes in the network. If a developer using another node is developing new source code (i.e., "working code"), and he/she wishes to use some previously completed, relevant source code as a reference, the code access system on the latter developer's node will be initiated. Once initiated, the code access system will first analyze the working code to identify a context thereof. Based on the context, one or more of the predetermined categories will be assigned to the working code. Then, using those categories, the directory is queried and a list of categories assigned to previously developed source code that is relevant to the working code is returned. When the developer selects a particular category from the list, the corresponding source code is retrieved from the appropriate node. Thus, the present invention provides access to source code patterns that were created by multiple developers, and that are stored at multiple locations over the peer-to-peer network. Moreover, the present invention provides efficient classification-based navigation and content dependent searching for code patterns from within a local IDE.

Figure 1:
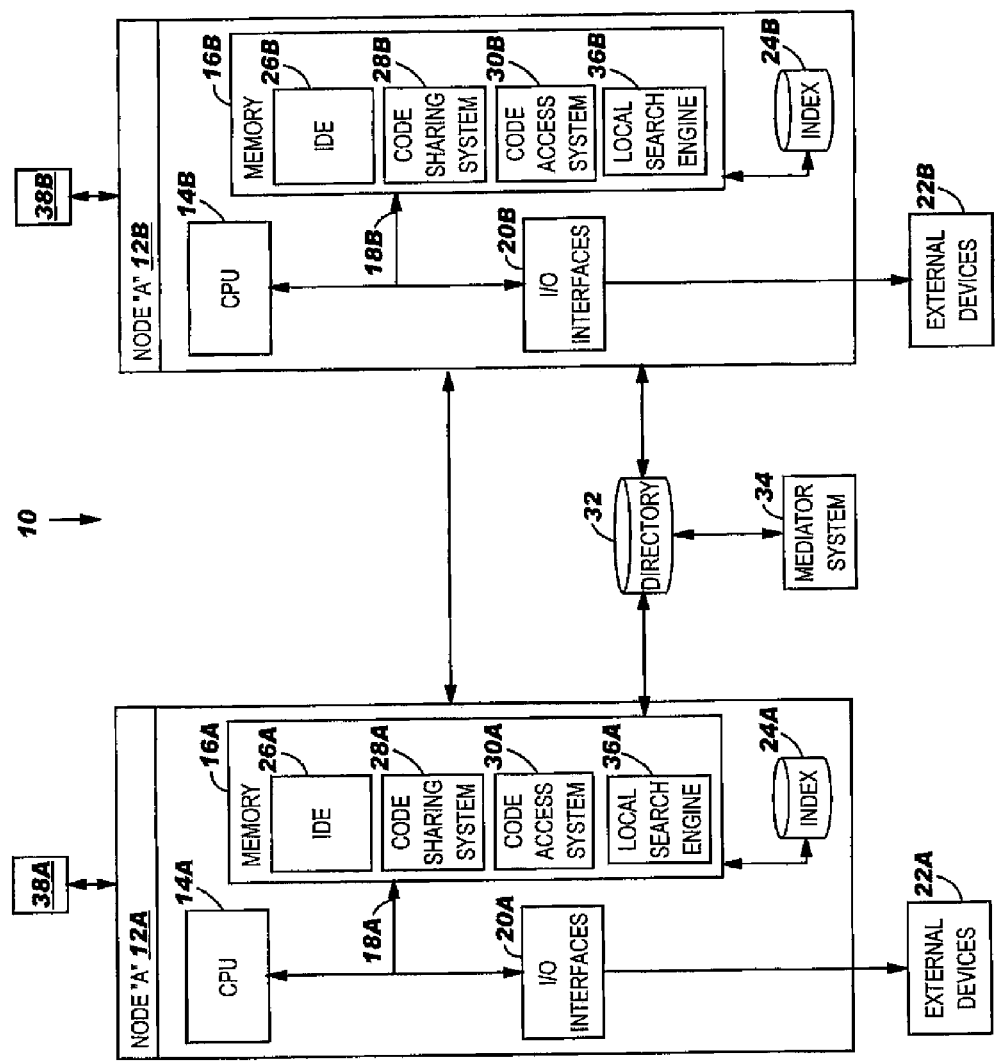
FIG. 1 depicts two illustrative nodes communicating in a peer-to-peer networking environment, according to one aspect of the present invention.

Referring now to FIG. 1, an illustrative peer-to-peer (P2P) network 10 is shown. As depicted, P2P network 10 includes node 12A (node "A") and node 12B (node "B"). It should be appreciated, however, that although two nodes 12A-B are depicted, P2P network 10 can actually include any quantity of nodes. Two nodes 12A-B are shown herein for illustrative purposes only. In any event, nodes 12A-B can be any type of computerized device capable of communicating in a network environment. For example, nodes 12A-B can be a computer system such as a personal computer or laptop, a handheld device such as a personal digital assistant or a cellular telephone, etc.

As shown, nodes 12A-B generally comprise central processing units (CPUs) 14A-B, memories 16A-B, buses 18A-B, input/output (I/O) interfaces 20A-B, external devices/resources 22A-B and indexes 24A-B. CPUs 14A-B may comprise a single processing unit, or be distributed across one or more processing units in one or more locations, e.g., on a client and server. Memories 16A-B may comprise any known type of data storage and/or transmission media, including magnetic media, optical media, random access memory (RAM), read-only memory (ROM), a data cache, a data object, etc. Moreover, similar to CPUs 14A-B, memories 16A-B may reside at a single physical location, comprising one or more types of data storage, or be distributed across a plurality of physical systems in various forms.

I/O interfaces 20A-B may comprise any system for exchanging information to/from an external source. External devices/resources 22A-B may comprise any known type of external device, including speakers, a CRT, LCD screen, hand-held device, keyboard, mouse, voice recognition system, speech output system, printer, monitor/display, facsimile, pager, etc. Buses 18A-B provides a communication link between each of the components in nodes 12A-B and likewise may comprise any known type of transmission link, including electrical, optical, wireless, etc.

Indexes 24A-B can be any systems (e.g., a databases) capable of providing storage for information such as selectively indexed source code under the present invention. As such, indexes 24A-B could each include one or more storage devices, such as a magnetic disk drive or an optical disk drive. In another embodiment, indexes 24A-B include data distributed across, for example, a local area network (LAN), a wide area network (WAN) or a storage area network (SAN) (not shown). It should also be understood that although not shown, additional components, such as cache memory, communication systems, system software, etc., may be incorporated into nodes 12A-B.

As indicated above, nodes 12A-B typically have the same capabilities. Accordingly, memory 16A-B of each node 12A-B includes IDE 26A-B, code sharing system 28A-B and code access/retrieval system 30B. In a typical embodiment, code sharing systems 28A-B and code access systems 30A-B are plug-ins to IDEs 26A-B. However it should be understood that this need not be the case. Rather, code sharing systems 28A-B and code access systems 30A-B could be independent systems that work in conjunction with IDEs 26A-B. In addition, although nodes 12A-B in P2P network 10 are shown to each include a code sharing system 28A-B and code access system 30A-B, this need not be the case either. For example, node 12A could only have code access system 30A, while node 12B could only have code sharing system 28B.

In any event, if a developer 38B operating node 12B wished to share source code with another developer over P2P network 10, he/she will do so utilizing IDE 26B and code sharing system 28B on node 12B. Similarly, if a developer 38A wished to retrieve previously completed source code to supplement his/her working code, developer 38A will do so utilizing IDE 26A and code access system 30A on node 12A. To this extent, as referred to herein a node that shares source code with another node is referred to as a "sharing" node, while a node that retrieves source code from a sharing node is referred to as a "receiving" node.

In the following illustrative example, assume that developer 38B has developed source code that he/wishes to share with developer 38A. As will be further described below in conjunction with FIG. 2, when source code is to be shared, developer 38B will select a button or the like in an interface of IDE 26B. This will cause code sharing system 28B to initiate. Upon initiation, the source code will be analyzed in an attempt to identify a set (e.g., 1 or more) of code patterns. Based on the identified code patterns one or more predetermined categories will be assigned to the source code. In identifying code patterns, code sharing system 28B attempts to identify the type of program the source code comprises. For example, source code for a web search engine would have particular code patterns that identify it as a web search engine. Once the set of code patterns is identified, the source code will be labeled with one or more predetermined categories that fit the code patterns. For example, the source code could be labeled with the "web search engine" category. In any event, once one or more predetermined categories are assigned to the source code, code pattern information is stored in directory 32, which is controlled by an independent mediator (computer) system 34. Similar to indexes 24A-B, directory 32 can be any system (e.g., a database) capable of providing storage for information such as code pattern information under the present invention. As such, directory 32 could include one or more storage devices, such as a magnetic disk drive or an optical disk drive. In another embodiment, directory 32 includes data distributed across, for example, a local area network (LAN), a wide area network (WAN) or a storage area network (SAN) (not shown).

In a typical embodiment, the code pattern information stored in directory 32 includes both the identified code patterns as well as the categories assigned to the source code. In addition, the code pattern information should also identify the node where the source code is stored. For example, the code pattern information could include the Internet Protocol (IP) address of node 12B. Regardless, after the code pattern information is stored in directory 32, code sharing system 28B will selectively index the source code, dependent code types and associated code types. That is the relevant portions of the source code, dependent code types and associated code types will be stored in index 24B. Thereafter, a notification will be sent to node 12A to inform developer 38A of the availability of the source code for sharing. Under the present invention, notifications can be sent to all other nodes in a P2P network 10, or only to selected nodes.

After the source code has been selectively indexed on node 12B, it can be access/retrieved by other developers. For example, if developer 38A was creating new source code (i.e., working code), and he/she wished to use previously created source code as a reference, developer 38A would select a button or the like in an interface of IDE 26A to initiate code access system 30A. Initially, code access system 30A would analyze the working code in a manner similar to source code. Specifically, the working code would be analyzed to identify a context of the working code to determine what type of program was being created. Similar to the source code, this could involve identifying a set (e.g., one or more) of code patterns. Once the context is identified, one or more of the predetermined categories would be assigned to the working code. For example, if the working code was for a new web search engine, the predetermined category of "web search engine" could be assigned thereto. After one or more predetermined categories have been assigned to the working code, code access system 30A would query the code pattern information in directory 32 to identify source code that is relevant to the working code. To this extent, code access system 30A will typically generate and send a query to directory 32 that includes the one or more categories assigned to the working code. These categories will be used to find similar or like categories stored in directory 32 for previously created source code. A response to the query is received by node 12A, and should list any categories that were deemed to match those assigned to the working code. That is, the response to the query will list the categories assigned to previously created source code that are relevant to the working code (assuming relevant source code exists). When developer 38A selects a particular category in the list, the code access system 30A will send a query for the corresponding source code to local search engine 36B of node 38B using the node identity/location information (e.g., IP address) that was included in the code pattern information for the source code. Local search engine 36B will then retrieve the source code from index 24B and send the same back to node 12A.

Figure 2:
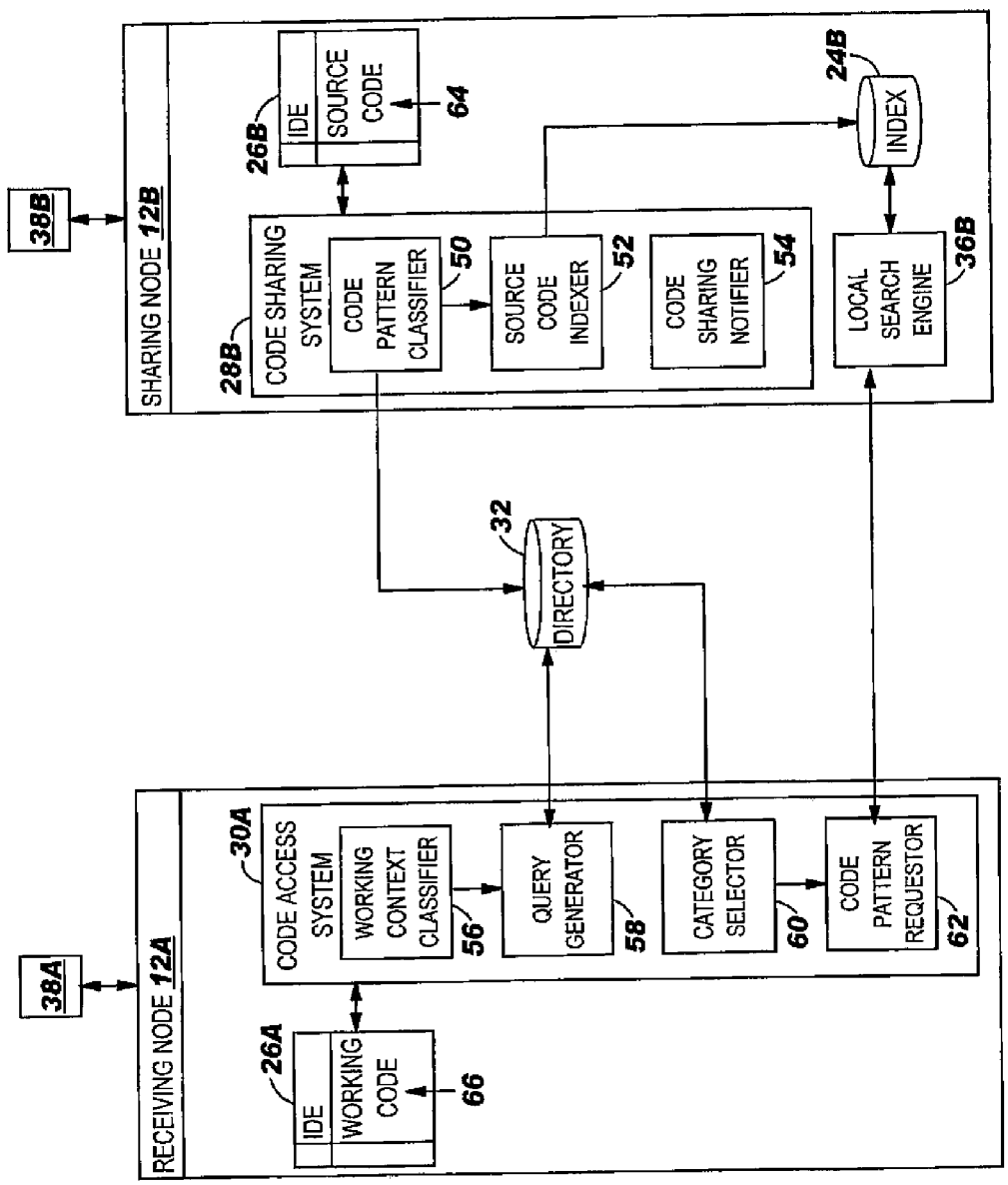
FIG. 2 depicts the code sharing system and code retrieval system of FIG. 1 in greater detail.

Referring now to FIG. 2, a more detailed description of the above illustrative example will be given. As indicated above, when developer 38B wishes to share source code 64 he/she has created, developer 38B can do so by selecting a button or the like in an interface of IDE 26B. This will cause code sharing system 28B to initiate. As shown, code sharing system 28B includes code pattern classifier 50, source code indexer 52 and code sharing notifier 54. When code sharing system 28B is initiated, code pattern classifier 50 will first analyze source code 64 to identify a set of code patterns, and to assign one or more predetermined categories to the source code base on the identified code patterns. For example, if source code 64 is for a web search engine, code pattern classifier 50 could assign the predetermined category of "web search engine" thereto. It should be appreciated that source code 64 could include multiple code patterns. As such, source code 64 could be labeled with multiple predetermined categories. In any event, once one or more predetermined categories have been assigned to source code 64, code pattern information that is based on the identified set of code patterns and the assigned categories will be stored in directory 32. As indicated above, the code pattern information will typically include the set of code patterns, the categories, as well as the identity/location of "sharing" node 12B (e.g., an IP address).

Figure 3:
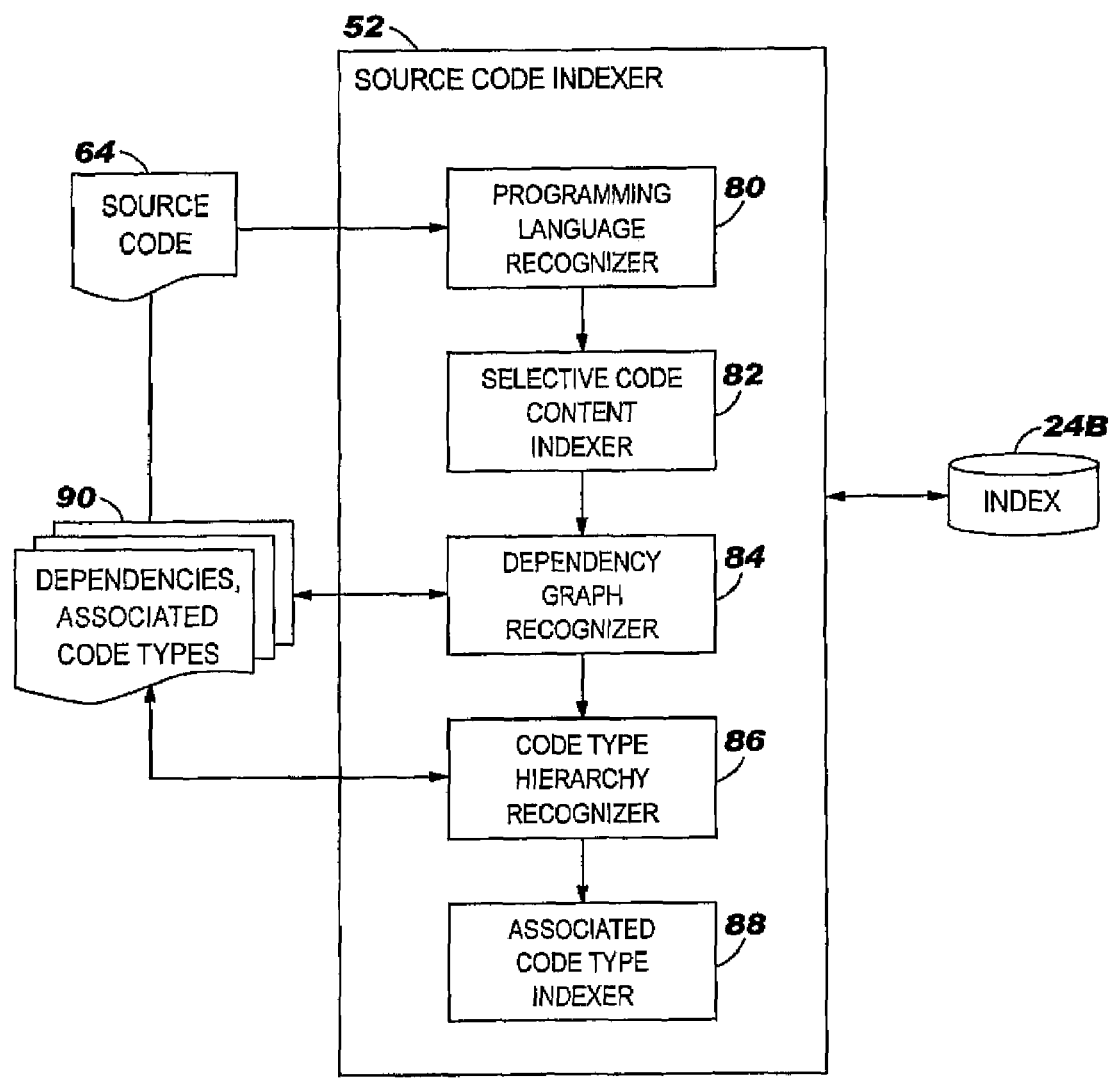
FIG. 3 depicts the source code indexer of FIG. 2 in greater detail.

After the code pattern information has been stored, source code indexer 52 will selectively index the source code 64 as well as any dependent and associated code types. Referring now to FIG. 3, a more detailed depiction of source code indexer 52 is shown. As depicted, source code indexer 52 generally includes programming language recognizer 80, selective code content indexer 82, dependency graph recognizer 84, code type hierarchy recognizer 86 and associated code type indexer 88. When selectively indexing source code 64, programming language recognizer 80 will first determine the programming language (e.g., JAVA, C++, etc.) in which source code 64 is written. As known, IDE 26B can be used to develop code in a number of different programming languages. Accordingly, source code 64 could be written in multiple different programming languages. Programming language recognizer 80 will analyze source code 64 and identify each such language. In one embodiment, programming language recognizer 80 could incorporate some or all of the teachings of the language translation product LINGUINI, which provides Language Identification for Multilingual Documents. Specifically, LINGUINI identifies the "cultural" languages (e.g., English, Spanish) in documents. As such LINGUINI can be adapted under the present invention to recognize different programming languages.

In any event, once the programming languages have been identified, selective code content indexer 82 will selectively index source code 64. Specifically, selective code content indexer 82 will store only the relevant portions of source code 64 in index 24B. In general, the relevant portions of source code 64 to be indexed depends upon the programming language thereof. For example, for a section of source code 64 written in JAVA, reserved terms such as "class" and "implements" need not be indexed. However, substantively relevant or important content such as comments, type names, method names, etc. should be indexed. Selective code content indexer 82 will analyze the sections of source code and index the relevant portions based on the programming language thereof. Once source code 64 has been selectively indexed, dependency graph recognizer 84 will identify and index the code types on which source code 64 depends. Specifically, as known, certain types/classes in source code 64 could depend on other types/classes. Dependency graph recognizer 84 will consult reference source 90 to identify and index such types/classes. Thereafter, code type hierarchy recognizer will identify any hierarchies of code types/classes that are associated with source code 64. Unlike dependent types/classes, associated types/classes are typically stored in a different location (e.g., a different file) in a hierarchy. Code type hierarchy recognizer 86 will identify any code type/class hierarchies associated with source code 64. Once identified, associated code type indexer 88 will selectively index the code types/classes in the identified hierarchies. This selective indexing occurs in a manner similar to the selective indexing of source code 64. Specifically, only the relevant portions of the associated code types/classes will be stored in index 24B.

Referring back FIG. 2, once source code 64 has been selectively indexed, code sharing notifier 54 will notify node 12A of the availability thereof. Thereafter, developer 38A is free to use source code 64 to create new programs. For example, assume that developer 38A is creating a new web search engine (working code 66), and he/she wishes to use previously created source code as a reference. In this case, developer 38A could initiate code access system 28A via an interface of IDE 26A to access source code 64 (or any other relevant source code). As shown, code access system 28A includes working context classifier 56, query generator 58, category selector 60 and code pattern requestor 62. Once code access system 28A has been initiated, working content classifier 56 will analyze working code 66 to identify a context thereof. In particular, similar to code pattern classifier 50, working content classifier will determine the nature of working code 66 and assign one or more predetermined categories thereto. Since developer 38A is attempting to create a new web search engine in this example, working code 66 could be assigned the predetermined category of "web search engine."

After one or more predetermined categories have been assigned to working code 66, query generator will generate and sent a query to directory 32. The query will at least include the categories assigned to working code 66, and will be processed by directory and mediator system 34 (FIG. 1) to find code pattern information (categories) that match or correspond to the categories in the query. After the query has been processed, a response is returned to category selector 60 that lists any predetermined categories assigned to previously created source code that is relevant to working code 66. In this example, since source code 64 was also assigned the predetermined category of "web search engine," that category should be included in the list. Developer 38A is free to then select any categories corresponding to source code he/she wishes to retrieve. Upon selecting a particular category in the list, code pattern requester 62 will retrieve the corresponding source code from the appropriate node. For example, if developer 38A selected the "web search engine" category in the list, code pattern requester 62 would send a request for source code 64 to local search engine 36B, which would retrieve source code from index 24B and return the same to node 12A. Once received, developer 38A can use portions or all of source code 64 in his/her working code 66.

It should be understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, although the illustrative example discussed herein involved node 12B being the "sharing" node and node 12A being the "receiving" node, any possible combination of roles is possible.

We claim:

1. A method for accessing source code shared over a network, comprising at least one computing device for processing the steps of:

providing the network with an Integrated Development Environment (IDE) which includes classification-based navigation and content dependent searching for code patterns;

analyzing working code on a receiving node in the network to identify a context of the working code, and assigning at least one predetermined category to the working code based on the identified context, wherein the categories include comments, type names and method names;

querying a directory using the at least one predetermined category assigned to the working code to identify at least one predetermined category assigned to source code that at least one of matches or corresponds to the category assigned to the working code;

returning a list of categories;

selecting at least one category from the list of categories;

retrieving the source code from a sharing node in the network to the retrieving node based on the at least one category selected from the list of categories, wherein the retrieving comprises querying a search engine corresponding to the sharing node to retrieve the source code;

analyzing the source code on the sharing node to identify a set of code patterns, and assigning the at least one predetermined category to the source code based on the identified set of code patterns;

storing code pattern information that is based on the analysis and assignment in a directory; and selectively indexing the source code, prior to analyzing the working code, wherein the indexing comprises:

recognizing at least one programming language of the source code;

analyzing sections of the source code;

indexing relevant portions of the source code based on the at least one programming language, wherein the relevant portions include comments, type names and method names;

recognizing and indexing at least one source code dependency corresponding to the source code; and recognizing a set of code type hierarchies associated with the source code; and indexing the code types in the recognized set of code type hierarchies;

notifying a set of other nodes in the network of the availability of the source code.

2. The method of claim 1, wherein the retrieving step comprises retrieving the source code from the sharing node to the retrieving node upon selection of the at least one category selected from the list of categories assigned.

3. The method of claim 1, wherein the retrieving step comprises querying a search engine corresponding to the sharing node to retrieve the source code.

4. The method of claim 1, further comprising notifying a set of other nodes in the network of the availability of the source code.

5. The method of claim 1, wherein the network is a peer-to-peer network.

\* \* \* \* \*